United States Patent
Roy (10) Patent No.: US 9,911,147 B2
(45) Date of Patent: Mar. 6, 2018

(54) SYSTEMS AND METHODS FOR IMPLEMENTING AUTOMATED INTELLIGENCE-BASED BIDDING FOR REPAIR SERVICES FOR ENVIRONMENTAL CONTROL SYSTEMS IN MONITORED BUILDINGS

(71) Applicant: Lars Energy Analytics, LLC, Severna Park, MD (US)

(72) Inventor: Randel E. Roy, Severna Park, MD (US)

(73) Assignee: LARS ENERGY LLC, Severna Park, MD (US)

( * ) Notice: Subject to any disclaimer, the term of this patent is extended or adjusted under 35 U.S.C. 154(b) by 310 days.

(21) Appl. No.: 14/723,438

(22) Filed: May 27, 2015

(65) Prior Publication Data

US 2015/0269641 A1    Sep. 24, 2015

Related U.S. Application Data

(63) Continuation-in-part of application No. 14/201,774, filed on Mar. 7, 2014.

(60) Provisional application No. 62/008,764, filed on Jun. 6, 2014.

(51) Int. Cl.
| | | |
|---|---|---|
| *G06F 11/00* | (2006.01) | |
| *G06Q 30/06* | (2012.01) | |
| *G05B 15/02* | (2006.01) | |
| *F24F 11/00* | (2018.01) | |

(52) U.S. Cl.
CPC ...... *G06Q 30/0611* (2013.01); *F24F 11/0086* (2013.01); *G05B 15/02* (2013.01)

(58) Field of Classification Search
CPC ............... B60C 23/00; B60C 23/0408; B60K 2350/1024
USPC .................................. 702/183, 182, 184, 185
See application file for complete search history.

(56) References Cited

U.S. PATENT DOCUMENTS

| | | | |
|---|---|---|---|
| 7,784,291 B2 | 8/2010 | Butler et al. | |
| 8,229,597 B2 | 7/2012 | Burton | |
| 8,527,098 B2 | 9/2013 | Burton | |
| 8,600,559 B2 | 12/2013 | Grohman et al. | |
| 2002/0000092 A1* | 1/2002 | Sharood | F25D 29/00 62/127 |
| 2007/0205296 A1 | 9/2007 | Bell et al. | |

(Continued)

*Primary Examiner* — Edward Raymond
(74) *Attorney, Agent, or Firm* — TannerIP PLLC; Daniel A. Tanner, III; James E. Golladay, II (57) ABSTRACT

A system and method are provided for implementing an automated bidding process in which a preliminary system-generated diagnosis (pre-diagnosis) of a heating, ventilation and air conditioning (HVAC) system difficulty may be generated and forwarded to a plurality of available or pre-selected HVAC repair facilities or contractors for soliciting and receiving competitive bidding for repair services from those HVAC repair facilities or contractors. A system-based automated solution is provided to lessen the burden on building owners or operators in soliciting "knowledge-based" bids for undertaking repairs to correct HVAC system issues raised in an automatically-generated HVAC system pre-diagnosis. An automated platform and/or scheme allow a plurality of HAVC contractors to offer bids for the repair services based on a pre-diagnosis forwarded to the plurality of contractors as part of a bid solicitation process for the repairs.

15 Claims, 4 Drawing Sheets

(56) References Cited

U.S. PATENT DOCUMENTS

2012/0054124 A1 3/2012 Rodrigues
2012/0222439 A1 9/2012 Pena
2012/0245968 A1 9/2012 Beaulieu et al.
2013/0339080 A1 12/2013 Beaulieu et al.

* cited by examiner

SYSTEMS AND METHODS FOR IMPLEMENTING AUTOMATED INTELLIGENCE-BASED BIDDING FOR REPAIR SERVICES FOR ENVIRONMENTAL CONTROL SYSTEMS IN MONITORED BUILDINGS

This application is a Continuation-in-Part of U.S. patent application Ser. No. 14/201,774, entitled "Systems and Methods for Implementing Environmental Condition Control, Monitoring and Adjustment in Enclosed Spaces" by Randel E. Roy filed on Mar. 7, 2014. This application is related to Ser. No. 14/723,452, entitled "Systems And Methods for Implementing Automated Confirmation of Completion of Repair Services on Environmental Control Systems in Monitored Buildings" by Randel E. Roy, filed on a same day as this application. This application claims priority to U.S. Provisional Patent Application No. 62/008,764 entitled "Heating ventilation and repair bidding system," by Randel E. Roy, filed on Jun. 6, 2014. The disclosures of the parent, related and priority applications are hereby incorporated by reference herein in their entirety.

BACKGROUND

1. Field of Disclosed Subject Matter

This disclosure relates to systems and methods for implementing an automated bidding process in which a preliminary system-generated diagnosis (pre-diagnosis) of a heating, ventilation and air conditioning (HVAC) system difficulty may be generated and forwarded to a plurality of available or pre-selected HVAC repair facilities or contractors for soliciting and receiving competitive bidding for repair services from those HVAC repair facilities or contractors.

2. Related Art

Environmental conditions in modern commercial and residential buildings are typically controlled to support occupant comfort, or to otherwise support provision of some specialized localized environment. Such specialized purposes can include cold rooms for refrigeration of various products, hot houses for indoor crop production, vacuum systems for maintenance of clean rooms, and/or critical control of the temperatures and/or humidity to support cooling of electronics components in, for example, large data centers. Environmental condition control is undertaken with many different and varying forms of electro-mechanical systems typically comprised of the following major components: compressor, condenser and condenser fan, closed piping loop with refrigerant and an air handling motor and fan (hereinafter referred to as an HVAC system). Such HVAC systems are known to typically reduce temperature and humidity within the involved buildings when outside air temperature and humidity are higher than the temperature and humidity conditions to be maintained within the buildings. Conversely, the HVAC systems are also known to typically increase temperature, while controlling humidity, within the involved buildings when outside air temperatures are lower than the temperature conditions to be maintained within the buildings. Except in the case of the certain specialized environmental conditions mentioned briefly above, occupant comfort is generally the benchmark for adjustment of the environmental conditions within a building, or in at least particular portions of the building. Depending on a size and purpose of the building overall, the environmental conditions may be adjusted to be consistent throughout the entire building, or the environmental conditions may be otherwise individually adjusted within one or more segregated portions of the building.

HVAC systems are often appropriately sized, or particularized, to provide appropriate environmental condition control within a building based on a number of factors regarding the building. These factors may include determining a specific size of a space within a building, or of the building overall, to be heated/cooled, as well as assessing typical outdoor environmental conditions in a location or region in which the building is located (often accounting for reasonable excursions beyond those typical conditions as may suit the owners, operators and/or occupants of the building). Certain assumptions and presumptions regarding (1) HVAC system operations and operating efficiency and (2) environmental integrity of the building also factor into decisions regarding a correct size of an HVAC system to be used for environmental condition control in the building.

The HVAC system, as configured and installed according to the above considerations, then operates under a variety of outdoor environmental conditions to attempt to correctly maintain the desired environmental conditions within the building. Rarely, however, will a particularly-configured HVAC system, as installed in or on a building, operate at peak efficiency in relevant external environmental conditions, for a variety of reasons, including among others system degradation, improper installation, improper operation, electrical/mechanical failure, failure of the control system, or system design. As such, there may typically arise a need or desire to make some modification to the HVAC equipment or its controls to improve the comfort of the building and its occupants.

HVAC systems, particularly those supporting environmental control in large commercial buildings, which, in turn, support many and widely varied businesses, can be very complex in their configurations. These HVAC systems often consist of multiple modularized components, each module, in turn, comprising significant numbers of moving parts. Mechanical system components and moving parts are often subjected to wear during operation that may cause them to operate with decreasing efficiency over time as parts wear and may ultimately wear out. Separately, mechanical system components may randomly fail in operation at any time. In some HVAC systems, certain of the modules also include one or more pressurized closed-loop sub-systems that generally contain some form of working fluid or "refrigerant." A phase of the working fluid is changed from a liquid to a gas and back to a liquid repeatedly to effect the transfer of heat from the inside of the building to the outside of the building. These coolant loops are appropriately sized according to the above, and related, factors. Pressurized sub-systems may develop leaks that can result in reduction of the heat transfer fluid within the pressurized sub-systems causing them to operate less efficiently as fluid levels are depleted to less than optimum. Over-supply, or under-supply, of working fluid, can cause the HVAC system to operate less efficiently. A loss in working fluid from those sub-systems may lead to premature failure of the overall HVAC system, or of specified components within the HVAC system as well. Deterioration in conditions in either of these scenarios may occur without knowledge of the owners, operators or occupants of the building being serviced by the HVAC system prior to ultimate system failure. The insidious nature of undetected degradations in HVAC system performance may lead to increasing inefficiencies adversely affecting system output causing even more random adjustments to the operation of the system thereby compounding the inefficiencies.

These above-described inefficiencies can be costly when "forcing" a building's HVAC system to operate to properly control the environmental conditions while operating in a degraded mechanical condition.

SUMMARY OF THE DISCLOSED EMBODIMENTS

As is clear from the above discussion, performance and efficiency of the HVAC systems controlling environmental conditions within buildings is highly dependent on those systems being properly maintained and managed. Despite the importance of operating a well-maintained system to maximize efficiency, in many commercial and residential buildings today, it is unlikely that the owners, operators or occupants of the buildings may pay requisite attention to the performance and the efficiency of the HVAC systems. This behavior may arise from a lack of understanding regarding the overall effect that inefficiencies in the operation of the HVAC systems may have on, for example, energy requirements to support environmental condition control within the building. Otherwise, the behavior may arise from an expectation that, absent some ultimate failure of the HVAC system to produce any, or any correct, output, the HVAC system is presumed to be operating "correctly." It is often the case that the first indication of some "deterioration" in a condition of an installed HVAC system arises when that system fails altogether. Fortunately for most common users, modern HVAC system installations include certain safeguard features that will shut the system down in response to certain detected faults in internal operating conditions for the HVAC system or system components. Such safeguards are generally intended to preclude catastrophic or cascading failure within the HVAC system that may otherwise require complete replacement of the system or significant modules within the system. In the operating space between 100% efficient operations of HVAC systems and catastrophic failure, many, if not most, HVAC systems operate at less than optimal efficiency based on improper levels of working fluids being present, overall inadequate maintenance, or other difficulties, including leaks in installed ductwork that may develop over time.

An improperly-maintained HVAC system can easily require 50% more energy to operate the system than would be required for the operation of a properly maintained system. Operating costs for all manner of businesses continue to increase. Principal among such operating costs are the costs associated with the myriad power requirements that are deemed necessary to support business operations. Power consumption, and the costs associated therewith, for environmental condition control may represent an inappropriately large percentage of the total energy costs of a building, particularly when adversely affected by the compounding inefficiencies in the performance of the environmental condition control systems, including the HVAC systems, described above.

Compounding difficulties arising from inefficiencies in HVAC system operation, building owners, operators and/or occupants are generally unaware of how energy is consumed, and particularly the energy directed toward controlling the environmental conditions within their buildings and operating environments. In fact, there are presently no business metrics that may point to potential difficulties based on structural (envelope) inefficiencies within the buildings. Additionally, there are presently no business metrics that, when faced with a subjectively-determined level of difficulty, may identify potential solutions to those determined difficulties that may aid in reducing overall energy consumption for the installed HVAC systems while maintaining a comfortable environmental condition in the building.

In view of the above shortfalls in currently-available monitoring, assessment and analysis tools for building owners, operators and/or occupants, U.S. patent application Ser. No. 14/201,774 (the 774 application), entitled "Systems and Methods for Implementing Environmental Condition Control, Monitoring and Adjustment in Enclosed Spaces" by Randel E. Roy filed on Mar. 7, 2014 introduces a system, system components, and a scheme that may provide business and operational intelligence to building owners or operators regarding energy use by environmental condition or climate control systems. The 774 application describes integrated monitoring, analysis, adjustment and/or control of: (1) operation of the environmental condition control systems; (2) operating efficiency factors associated with the environmental condition control systems; (3) operating efficiency factors associated with support components, including ducting, supporting the environmental condition control systems; and/or (4) operating efficiency factors associated with the operating envelope of the buildings within which the environmental condition control systems are operated, including envelope inefficiencies, HVAC operating inefficiencies, and airflow inefficiencies, among others.

Once the above described HVAC system monitoring and analysis is undertaken/completed, the owners or operators of the "monitored" buildings may be provided with an analysis of system difficulties that they may use to generally then seek outside assistance in addressing. Current HVAC system shortfalls may be highlighted in a report that takes the form of preliminary HVAC system diagnoses (pre-diagnosis) provided to the owners and operators of the "monitored" building.

Those of skill in the art recognize that there are differing numbers of individual HVAC system repair contractors in any particular area (proximate to the "monitored" building) that may have the capacity and/or expertise to address the HVAC system shortfalls determined in the analysis and reported in the pre-diagnosis. There will be circumstances in which the building owner or operator will find it advantageous to determine among those individual contractors which one or more of the "acceptable" contractors may be able to address the system difficulties in a most cost-effective and timely manner, understanding that certain repair tasks may be addressable "in-house."

Exemplary embodiments of the systems and methods according to this disclosure may implement a system-based automated solution to lessen the burden on building owners or operators in soliciting "knowledge-based" bids for undertaking repairs to correct HVAC system issues raised in an automatically-generated HVAC system pre-diagnosis.

Exemplary embodiments may improve a speed and accuracy of HVAC system repair by providing an automated platform and/or scheme by which building owners or operators may solicit bids from a pre-selected group of HVAC contractors.

Exemplary embodiments may provide an automated platform and/or scheme by which a plurality of HAVC contractors may offer bids for the repair services based on a pre-diagnosis forwarded to the plurality of contractors as part of a bid solicitation process for the repairs.

Exemplary embodiments may advantageously supplement a real-time pre-diagnosis with historical data collected from each HVAC system. The historical data may include operating data of the HVAC system and/or system components (including ducting) subjected to certain proprietary algorithms developed using data collected from many HVAC systems. In embodiments, the pre-diagnosis may be refined with this assessment of historical data to identify potential issues and produce a pre-diagnosis with further granularity and fidelity to be forwarded to the HVAC repair contractors for soliciting bids therefrom.

Exemplary embodiments may provide an opportunity for building owners and operators to intervene in the solicitation process to add specific operational information for the building or spaces, or to direct the services to their own internal staff for repair, or for further evaluation as an option to be considered in the open bidding to one or more HVAC contractors to provide quotes for the repairs.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an automated bidding process in which a preliminary system-generated diagnosis of an HVAC system difficulty may be generated and forwarded to a plurality of available or pre-selected HVAC repair facilities or contractors to solicit and receive bidding for repair services, will be described, in detail, with reference to the following drawings, in which.

DETAILED DESCRIPTION OF THE DISCLOSED EMBODIMENTS

The systems and methods for implementing an automated bidding process in which a preliminary system-generated diagnosis of an HVAC system difficulty may be generated and forwarded to a plurality of available or pre-selected HVAC repair facilities or contractors to solicit and receive bidding for repair services according to this disclosure will generally refer to this specific utility or function for those systems and methods. Exemplary embodiments will be described and depicted in this disclosure as being particularly adaptable to implementing a methodology that is intended to ease a burden on a building owner or operator in streamlining expeditious and accurate solicitation and receipt of it for effecting repairs and installed HVAC systems. The disclosed systems, methods, and/or schemes should not be interpreted as being specifically limited to any particular configuration of an environmental condition control device or system, an electro-mechanical air handling device or system, and/or an HVAC device or system. Additionally, exemplary embodiments of the disclosed systems, methods and/or schemes should not be interpreted as being specifically directed to any particular intended use, including any particularly limited environmental condition control or occupant comfort control. For example, the disclosed systems, methods and/or schemes may be applicable to control of environmental conditions in a space that is configured as a refrigerated space, as a greenhouse-type space, as a "clean room" workspace, as a temperature/humidity controlled data center space, or any other structure, portion of a structure, or space with a structure that may have particular temperature and humidity control requirements beyond those requirements typically imposed for occupant comfort. In other words, any advantageous combination of the disclosed features and/or schemes that may be effectively employed to provide building owners and/or operators an opportunity to expedite selection of, and contract for, HVAC repair services through an automated bidding solicitation and receipt system, the solicitations including an HVAC system pre-diagnosis as described in this disclosures, for a particular climate-controlled building or enclosed space is contemplated as being encompassed by this disclosure.

Specific reference to, for example, various configurations of environmental condition control devices or systems, electro-mechanical air handling devices or systems and/or HVAC devices or systems as those concepts and related terms are captured and used throughout this disclosure, should not be considered as limiting those concepts or terms to any particular configuration of the respective devices, overall systems or individually-described system components or elements. The subject matter of this disclosure is intended to broadly encompass systems, devices, schemes and elements that may involve environmental condition control, climate control and the like as those functions may be familiar to those of skill in the art of environmental condition or climate control.

Conventionally, operating conditions of an HVAC system associated with a particular building may only have been evaluated under one of two conditions: (1) when the HVAC system shuts down based on failure of one or more components, or based on a system-detected fault in one or more components; or (2) when a particular, all-too-infrequent, routine maintenance interval expires, e.g., once every three to six months as part of a maintenance program initiated by the building owner or operator. In such instances, an HVAC service/repair technician may be specifically requested to evaluate a "health" of the HVAC system. This "health" monitoring or assessment may include the service/repair technician taking measurements of system parameters at critical points throughout the HVAC system, and in the enclosed space or building serviced by the HVAC system. While the service/repair technician may write down the results of the evaluation as, for example, test results, the test results may be used for nothing more than for the service/repair technician to make particular adjustments or replace particular HVAC system components. The test results may then be re-evaluated by the service/repair technician, according to his or her expertise, to determine (in a subjective manner) whether the actions that the service/repair technician undertook restored the HVAC system closer to its standard operating parameters. Typically, the test results are not collected or correlated, or recorded in a database for any type of historical tracking of the maintenance condition, operating state, or operating efficiency of the HVAC system in that building and certainly no correlation is undertaken with regard to the operation of like HVAC systems in other buildings. In fact, service/repair technician on-the-spot test results are typically discarded so as to be lost the moment the service/repair technician leaves the building having completed servicing and/or minor repair of the HVAC system.

Even as systems and methods may have been introduced to more routinely track the maintenance condition, operating state or operating efficiency of the HVAC system, there has remained no consistent means of measuring the static and dynamic efficiency of the building envelope itself. Moreover, duct efficiency, as a separate and distinct operating effectiveness parameter, is rarely, if ever, considered as part of the evaluation of the HVAC system by the HVAC system service/repair technician. In short, there exists no currently-implemented combination of related and interactive monitoring devices coupled to analytical software that may calculate HVAC efficiency, building envelope efficiency and duct efficiency in real time, particularly in a manner that allows for an analysis of the interaction between these efficiency components to provide business and operational intelligence to building owners or operators regarding energy use by environmental condition or climate control systems within the building. The systems and methods described in the 774 application address these shortfalls.

An objective of the systems and methods disclosed in the 774 application is to provide this business and operational intelligence to building owners, operators or other stakeholders regarding energy use by environmental condition or climate control systems within the building. It is intended that those systems and methods may provide these individual users or user entities with better, and more consistent, knowledge regarding how well the HVAC systems in a particular building are operating, insight into energy losses attributable to inefficiencies in the duct systems, and an analytical assessment of how much energy is being lost to the building envelope. The building owners or operators may also be afforded a capacity to compare all of these measurements for one building to all of these measurements for other similar buildings, whether these buildings are co-owned or owned by others. With such an analytical assessment of an overall HVAC system efficiency, it is anticipated that building owners and/or operators may institute processes that will result in reduced maintenance expenses and prolonging of the life cycles of the HVAC systems overall. An advantage of such systems and methods is that the monitoring and analysis of the HVAC system operations and operational efficiencies is advantageously supplemented with coincident monitoring and analysis of other related factors that impact an overall environmental condition or climate control scheme for a particular building. Put another way, an advantage of those schemes and techniques is provided in the reliance on collected data regarding the efficiency of the ducts and the efficiency of the building envelope, collected in real time, and analyzed to the benefit of the building owner or operator as a supplement to information regarding operations, and operational efficiencies, of the HVAC system alone.

Most building owners, operators and/or occupants are not skilled in any way in diagnosing, much less repairing, installed the HVAC equipment. Qualified (and generally, licensed) HVAC service technicians are often required to diagnose the problems and make the repairs. When a building owner, operator or occupant perceives that there is a problem with the HVAC system through subjective monitoring of the environmentally-controlled environment, an HVAC repair facility or contractor is called to both diagnose and repair the problem. Because of the intermittent nature of certain problems, however, a one-time assessment of the HVAC system, system components, system operation or equipment may not lead to a "correct" diagnosis of an underlying problem. This condition may actually mask a particular difficulty in a manner that prevents the HVAC repair contractor from achieving an accurate diagnosis of the "real" problem in a manner that allows the contractor to effect necessary repairs and/or adjustments. A short-term fix that addresses the immediate symptoms may make the occupants happy, but may fail to uncover the root cause, may exacerbate system inefficiencies, and or may adversely affect the life-span of particular components.

Each step in a diagnostic and repair process includes a certain lag time in effecting system repairs that are all-too-often more time critical than the conventional process may address. For example, because time is often of the essence in HVAC repair and scheduling a service repair visit may often takes days or weeks, it is rare that a particular building owner or operator will extend the lag time in the process by taking the additional and often difficult step of soliciting and receiving multiple bids/opinions regarding the HVAC problem and recommended repair.

The disclosed systems and methods, referred to a an HVAC repair bidding system or HVAC RBS, implement a system based scheme for soliciting bids from among a plurality of HVAC repair facilities or contractors in a standard, understandable and straightforward form that is comparatively expeditions and accurate. Solicitations and proposals are automated and provide a detailed pre-diagnosis available from the systems and methods described below. Data and key operating parameters are reviewed and that information is provided along with a pre-diagnosis to the plurality of prospective HVAC repair service providers. The service providers, in turn, evaluate the received data and provide quotes (time and money) for repair services armed with some level of a comprehensive historical knowledge of the particular HVAC system operating parameters and conditions. Conventional building monitoring systems may make data available either on-site or off-site, via various communication links including the Internet, but none of these systems offer both historical data and a pre-diagnosis simultaneously and in a prescribed format to a larger group of HVAC contractors for the purposes of those contractors providing bids for the repair work.

Building owners and operators may benefit because HVAC system problems are diagnosed more accurately, leading to an ability to effect repairs more quickly in an environment in which the marketplace sets the price based on the competition for the work introduced by the bidding process. HVAC repair facilities and contractors may benefit because they can respond directly to qualified prospective customers who are in immediate need of repair services with a certain level of pre-knowledge that allows them to understand the nature of the problem and competitively bid for the work within a particular community. By providing the above-described historical operating data to prospective building owners or operators, and to HVAC repair facilities or contractors, in addition to a method for soliciting and providing bids, the disclosed systems, methods, techniques, processes and/or schemes provide a novel and previously unavailable platform for expediting accurate repairs. It is also contemplated that HVAC repair service facilities or contractors will benefit from improved diagnostics and lower costs to service the HVAC systems and equipment overall. Service technicians may experience reduced time on site to perform maintenance and repairs because operating data has been collected and provided previously. Benefits to users may include the repairs being more accurately effected, in a more expedited manner and at significantly reduced cost. The use of the historical data regarding HVAC system operation may support a higher fidelity diagnosis, and the potential for multiple HVAC repair service providers to compete in a knowing, effective and efficient manner.

Figure 1:
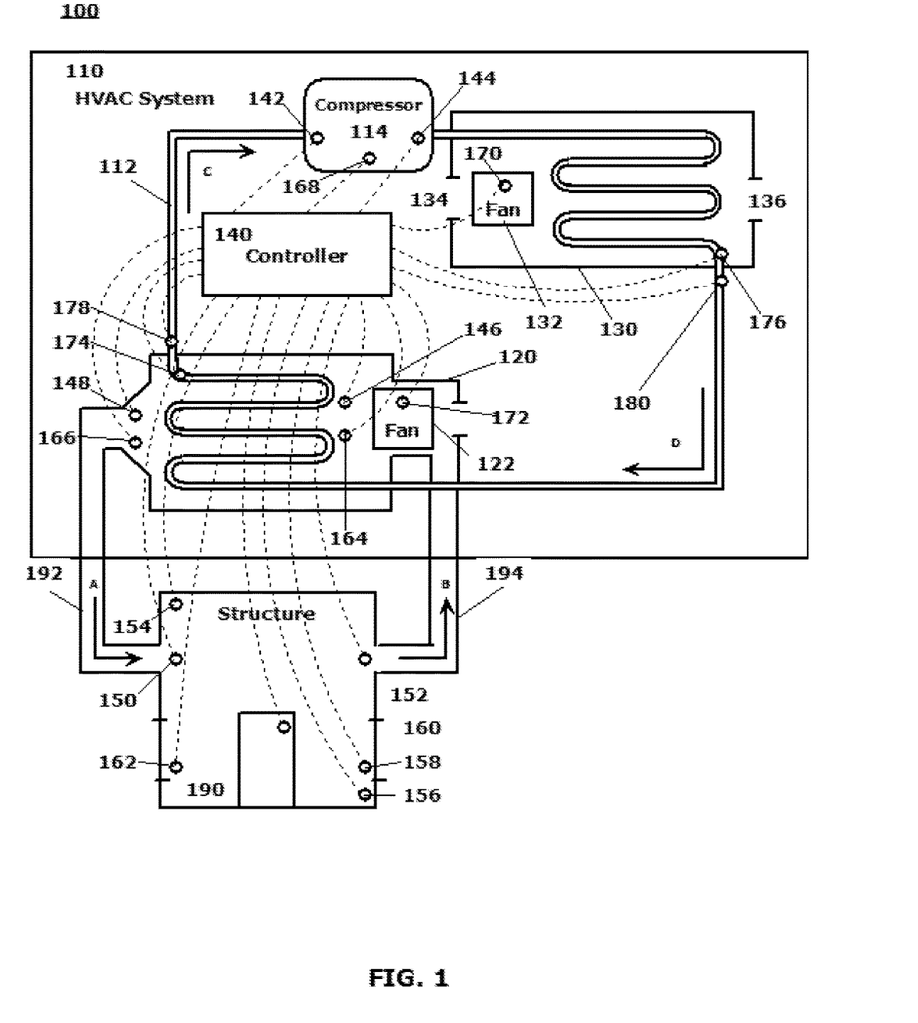
FIG. 1 illustrates a schematic diagram of a configuration for an operating environment within which an exemplary environmental condition control, monitoring, analysis and adjustment system is employed for generating a pre-diagnosis of an HVAC system difficulty for use in a bidding scheme according to this disclosure.

FIG. 1 illustrates a schematic diagram of a configuration for an operating environment 100 within which an exemplary environmental condition control, monitoring, analysis and adjustment system according is employed for generating a pre-diagnosis of an HVAC system difficulty for use in abiding scheme according to this disclosure. As shown in FIG. 1, an exemplary structure 190 may have associated with it a particularly-configured environmental condition control or exemplary HVAC system 110. The particularly-configured exemplary HVAC system 110 may condition a supply of temperature-adjusted and/or humidity-adjusted forced air to be fed to the structure 190 in direction A through one or more supply ducts 192. Return air may then be recovered or evacuated from the structure 190 in direction B through one or more return ducts 194 to be re-conditioned or otherwise processed in the HVAC system 110.

Typical configurations of an exemplary HVAC system 110, such as that shown in FIG. 1, may include one or more pressurized closed-loop piping systems 112 in which a heat transfer fluid or refrigerant may be circulated in the direction indicated by arrows C and D. As is well known in the art, the heat transfer fluid is directed to an inlet side of a compressor 114. The compressor 114 compresses relatively cooler, low-pressure heat transfer fluid (in a vapor phase) and pumps out higher-pressure hot heat transfer fluid. The compressor 114 may be a motor driven device that facilitates the flow of the heat transfer fluid through the one or more pressurized closed-loop piping systems 112 by drawing the low-pressure, low-temperature heat transfer fluid from an evaporator section 120 and outputting the high-pressure, higher temperature heat transfer fluid, compressed in the compressor 114, to a condenser section 130.

The one or more pressurized closed loop piping systems 112 may follow a serpentine path (as shown) in the condenser section 130. An object of the condenser section 130 is to function to release enough heat to the outside air to cool the heat transfer fluid from a hot gas vapor state to a less-hot liquid state. This is generally accomplished by activating a condenser fan 132 to take air from an inlet 134 opening, force that air across the one or more closed loop piping systems 112 in whatever configuration the piping may be presented in the condenser section 130, and to exhaust that air out of the condenser section 130 via, for example, an outlet 136.

The heat transfer fluid exiting the condenser section 130 in a liquid phase then continues to the evaporator section 120. The evaporator section 120 acts as a heat exchanger that exchanges heat from the return air recovered from the structure 190 via the one or more return ducts 194 with the liquid phase heat transfer fluid being carried through the evaporator section 120 by the one or more closed-loop piping systems 112, again possibly in a serpentine configuration as shown in FIG. 1. With the assistance of an evaporator fan 122 provided in the evaporator section 120, the return air from the structure 190 is forced through the evaporator section 120 across the one or more closed loop piping systems 112 circulating the heat transfer fluid. The heat transfer fluid absorbs the heat that is transferred from the air passing over the piping in the evaporator section 120. The supply air is forced back into the structure 190 via the one or more supply ducts 192 in direction A.

Those of skill in the art will recognize that the above description represents a very basic description of an operation of an exemplary HVAC system 110 such as that shown in FIG. 1, and that wide variations in included components, functions of those components, and overall system configurations may be undertaken.

The disclosed systems and methods add to the typical HVAC system 110 supporting environmental condition control in a structure 190 by providing a controller 140 in communication with a plurality of individual sensors provided in the HVAC system 110 itself, the inlet/outlet ducts 192,194 and throughout the structure 190.

The controller 140 may be particularly configured to receive signals from a plurality of temperature sensors. These temperature sensors may include, for example, a compressor inlet fluid temperature sensor 142, an evaporator outlet fluid temperature sensor 174, a condenser-outlet fluid temperature sensor 176, a compressor outlet fluid temperature sensor 144, a pre-evaporator return air temperature sensor 146, a post-evaporator supply air temperature sensor 148, a structure supply air temperature sensor 150, a structure return air temperature sensor 152, a structural environment warm air sensor 154, a structural environment cool air sensor 156, and one or more temperature sensors 158,160, 162 that may be associated with one or more environmental openings from the structure to the outside environment.

The controller 140 may be further particularly configured to receive signals from a plurality of humidity sensors including, but not limited to, a pre-evaporator humidity sensor 164 and a post-evaporator humidity sensor 166.

The controller 140 may be further particularly configured to receive signals from a plurality of pressure sensors including but not limited to, a post-evaporator fluid pressure sensor 178, and a post-condenser fluid pressure sensor 180.

The compressor inlet fluid temperature sensor 142 may be placed in, or in contact with, the one or more closed loop piping systems 112 on the inlet side of the compressor 114 to take the temperature of the low pressure heat transfer fluid returning to the compressor 114. The compressor outlet fluid temperature sensor 144 may be placed in, or in contact with, the one or more closed loop piping systems 112 on the outlet side of the compressor 114 to sense the temperature of the high pressure heat transfer fluid leaving the compressor 114. The pre-evaporator return air temperature sensor 146 and the pre-evaporator humidity sensor 164 may be placed in the return airstream just prior to the evaporator, and on either side of the evaporator fan 122 in the evaporator section 120 to respectively sense the temperature and humidity of the air returning from the structure 190 via the one or more return ducts 194. The post-evaporator supply air temperature sensor 148 and the post-evaporator humidity sensor 166 may be placed in the supply air airstream just after the evaporator to sense the temperature and humidity of the air after it has been conditioned by the evaporator section 120, but prior to entering the one or more supply ducts 192 that carry the conditioned supply air to the structure 190. The structure supply air temperature sensor 150 may be placed in the supply air airstream at the mouth of the one or more supply ducts 192, for example, just at, or closely in a vicinity of, a point where the conditioned air exits the one or more supply ducts 192 to be introduced into the structure 190. This structure supply air temperature sensor 150 may measure the temperature of the conditioned supply air specifically at the point that the supply air is introduced into the structure 190. The structure return air temperature sensor 152 may be placed at the mouth of the one or more return ducts 194 at, or closely in a vicinity of, a point where the return air leaves the structure 190 on its way to be conditioned by the exemplary HVAC system 110. The structure return air temperature sensor 152 may measure the temperature of the return air at the point that the return air is being drawn into the one or more return ducts 194 exiting the structure 190.

The structural environment warm air sensor 154 may be placed in a comparatively high position within the structure 190 to assess an overall warm air temperature condition within the structure. The structural environment cool air sensor 156 may be placed in a comparatively low position within the structure 190 to assess an overall cool air temperature condition within the structure. Differences in temperatures measured by the structural environment warm air sensor 154 and the structural environment cool air sensor 156 may aid in a further detailed analysis of the environmental condition control within the structure 190. The one or more temperature sensors 158,160,162 that may be associated with one or more environmental openings from the structure 190 to the outside environment may be placed on, or in a vicinity of, respective operable doors and/or windows in the structure 190 to monitor one or more of operation of the respective operable doors and/or windows and to measure temperatures respectively in a vicinity of the operable doors and/or windows in the structure 190.

Additionally, the controller 140 may be particularly configured to receive signals from a plurality of current transducers including, but not limited to, a compressor motor current transducer 168, a condenser fan motor current transducer 170, and an evaporator/air handler fan motor current transducer 172. The compressor motor current transducer 168 may be placed on, or in a vicinity of, the electrical wiring providing electrical power to the compressor 114 to measure the electrical current flowing into the compressor 114 as a measure of the electrical power being expended by the operation of the compressor 114. The condenser fan motor current transducer 170 may be placed on, or in a vicinity of, the electrical wiring providing electrical power to a motor driving the condenser fan 132 to measure the electrical current flowing into the condenser fan 132 as a measure of the electrical power being expended by the operation of the condenser fan 132. Similarly, the evaporator/air handler fan motor current transducer 172 may be placed on, or in a vicinity of, the electrical wiring providing electrical power to a motor driving the evaporator fan 122 to measure the electrical current flowing into the evaporator fan 122 as a measure of the electrical power being expended by the operation of the evaporator fan 122.

All of the above-described temperature, humidity and/or current monitoring sensor components, as listed, may be communicatively connected to the controller 140 via one or more wired or wireless links that may allow the controller 140 to receive a signal from each of the temperature, humidity and/or current monitoring sensors, the controller 140 converting the electrical signals to temperature, humidity and/or amperage readings for each of the temperature, humidity and/or current monitoring sensors. The controller 140 may store the received sensor information in an internal data storage device and/or employ an internal processor to process the received sensor information. Otherwise, the controller 140 may transmit the received sensor information to one or more remote data storage devices to be stored and/or to one or more remote processors to be processed. Communication with any remote data storage device, or any remote processor, may be via wired or wireless means.

External data storage and/or processing capabilities may be undertaken by a dedicated local or remote computer assigned to the data monitoring, collection and analysis functions, or by a non-dedicated local or remote computer, for example, running routine that undertakes the data monitoring, collection and analysis functions along with other processing functions carried out by the non-dedicated local or remote computer.

No particular limitation on a frequency by which sensor data may be received, collected, stored and/or analyzed is implied. In other words, the sensor data may be received by the controller 140 as frequently as once every millisecond, or as infrequently as once every day. Further, it is anticipated that, in embodiments, the sensor data stored on a particular storage device may then be uploaded to a structure database to facilitate sensor data manipulation by the processor and/or to create a historical database for analysis. The disclosed local or remote processor may manipulate the collected sensor data to calculate one or more of the following measures.

An efficiency of the HVAC system itself may be calculated. An engineering-based definition of efficiency is Energy Out/Energy In, or Work Out/Work In. In one or more of the disclosed embodiments, "Energy In" may be defined as a value derived from an electricity consumption measured, for example, in watts, of the compressor motor, the condenser fan motor and the evaporator/air handling fan motor, taken in combination. The "Work Out" may be defined as a value derived from a change in temperature and humidity (enthalpy) across the one or more closed-loop piping systems 112 in the evaporator section 120 (the evaporator coil).

In addition to the overall efficiency calculations described above, there are two additional measures of efficiency that the exemplary system 100 may calculate to assess the potential source of inefficient behavior. First, the system will calculate superheat, which those of skill in the art recognize is the number of degrees a vapor is above its saturation temperature (boiling point) at a particular pressure, typically measured at the outlet of the evaporator. Second, the system will calculate sub-cooling, which those of skill in the art recognize is the number of degrees a liquid refrigerant is colder than the minimum temperature (saturation temperature) required to keep it from boiling and, hence, change from a liquid to a vapor phase, and is often calculated at the exit of the condenser.

An efficiency of the air ducting may be calculated. The air duct system supporting the structure 190, and most specifically, the one or more supply ducts 194 provide a pathway for supply air to be moved from the evaporator section 120 where the supply air is conditioned, to various parts of the structure 190 where occupants may live and/or work. Characteristics of the configuration of any air duct system, including discontinuity in construction of the individual air ducts, may create holes, gaps and other like leakage points in the air duct system. These leakage points, coupled with un-insulated exposure of the air duct system to outside air temperatures, reduce efficiency of the air duct system, i.e., ductwork is never 100% efficient.

The disclosed schemes may calculate the efficiency of the air ducting as a percentage of energy loss in the one or more supply ducts 192 relative the energy created in the evaporator section 120 as a measure of the efficiency of the one or more supply ducts 192. The efficiency of the air ducting calculations may be generally undertaken by collecting temperature data from the following sensors: the pre-evaporator return air temperature sensor 146, the post-evaporator supply air temperature sensor 148, the structure supply air temperature sensor 150 and the structure return air temperature sensor 152.

Overall duct efficiency may be broken into two distinct efficiency measurements. The first measurement is the return duct efficiency and the second is the supply duct efficiency. Combined, the return and supply duct efficiencies provide a view of the efficiency of the entire duct system. The return duct efficiency is calculated based on the temperature loss between the structure return air temperature sensor 152 and the pre-evaporator return air temperature sensor 146. Losses can be measured in degrees, or as a percentage of a total change in temperature (delta T) created by the evaporator section 120. For example, if the temperature measured by the structure return air temperature sensor 152 is 75 degrees and the temperature measured by the pre-evaporator return air temperature sensor is 78 degrees, the duct system is responsible for a loss of three degrees of cooling. Further, if the post-evaporator supply air temperature sensor 148 measures the temperature at 65 degrees, the evaporator section 120 is shown to create 10 degrees of delta T, but 3 degrees of delta T are being lost in the return duct, we would calculate that the return duct losses are equal to a value of 30%.

Supply air losses may be calculated similarly by measuring the difference between a temperature of the supply air measured by the post-evaporator supply air temperature sensor 148 and a temperature of the supply air entering the structure 190 measured by the structure supply air temperature sensor 150. If, in this example, the supply air temperature in the structure 190 as measured by the structure supply air temperature sensor 150 is 70 degrees, 5 degrees of delta T were lost in the one or more supply ducts 192. This would mean that the supply duct system, i.e., the one or more supply ducts 192, is only 50% efficient and the total duct system is only 20% efficient. Stated another way, the entire duct system has 80% losses.

While the above example is based on measuring cooling efficiency, a similar process is used in calculating duct losses when the system is operating in heating mode.

The disclosed schemes may calculate efficiency of the building envelope. Building envelope is made up of all a building's exterior structure that is exposed to outside air temperature and humidity conditions. The walls, windows, and roof make up most of the building's envelope. Conventionally, the environmental condition control industry has used R-values, or U-values to measure how well each of these exposed structural components resist heat transfer and thus assess an ability of each of these exposed structural components to keep the cold in/out and the heat out/in, depending on the external environmental conditions.

The disclosed schemes may calculate how effective the structural components of the building are combined, by calculating energy losses per square foot of exposed building envelope, measured in energy losses per square foot per hour. Because energy losses per square foot per hour vary widely based on the difference between the outside temperature and the target inside temperature, the disclosed schemes may add another dimension to the measurement in the form of degree of delta T across the building envelope. Therefore, the disclosed schemes measure building envelope efficiency in terms of, for example, a BTU loss per square foot per hour per degree of delta T.

To calculate the energy losses per square foot per hour, the disclosed schemes first calculate the actual cooling/heat delivered to the building per hour from the HVAC system. The need for heating/cooling is a function of two things, operations of the building and losses from the building envelope. The operations of the building include heat load added to the building from things like computers, heat given off by the occupants, heat generated from lighting, and heat entering the building from opening the door. These are just a few examples of the heat gained from operations (in this example, it is assumed that the building is being operated in a cooling mode, but a similar analysis can be performed when the building is being operated in a heating mode). Based on a desire to isolate and quantify a building's operational need for heating/cooling from the need for heating and cooling as a function of losses from the building envelope, the disclosed schemes first incorporate methods of isolating these two components.

One way to isolate the two components is to stop all operations of the building and measure the static heat losses/gains when the operations of the building are at a standstill. In some cases, this may be simple as understanding that many commercial building enterprises have effectively ceased all operation at night, nighttime energy requirements are then a function of building envelope static losses only. This methodology works well for restaurants, commercial office buildings and a large number of other commercial buildings that are subjected to routine periods of general inactivity.

There are, however, situations where the above measurements of static heat losses/gains may not be as easily achievable. Take, for example, operations of some commercial buildings like hospitals and hotels that are subject to virtually round-the-clock operations, at least at some level. In these cases, the disclosed schemes may measure the heat load from operations in a building by measuring the electricity consumed in the building at the main meter combined with sub-meters for major subsystem like lighting, or HVAC systems. Heat gain from operational losses is then calculated based on electricity consumption by specifically measurable types (HVAC, lighting, refrigeration, computers, etc.) times a heat loss associated with each category. The sum total of all heat lost from each category is the total operational heat gain of the building which can be subtracted from the total heat gain to get the heat gain from the building envelope.

The disclosed schemes may calculate percent energy consumed when the building is unoccupied. In this regard, the disclosed schemes are usable to calculate how much energy is consumed during occupied and non-occupied hours for a particular building. Again here, these calculations regarding the energy consumed during occupied and non-occupied hours may be made in two ways. The first way is to assume that the operational hours of the business are the occupied hours (for a restaurant and other retail establishment, the occupied hours also includes set-up and clean-up periods before and after the posted business hours open to the public). The second way is to use motion detectors to determine if anyone is still in the building. The processor may then segregate the calculations according to these categories.

Those of skill in the art will recognize that the disclosed schemes are unique in that, to date, those involved in the enclosed space environmental condition and climate control industry evaluate, if anything, only a performance, health and/or efficiency of the HVAC system, generally on an infrequent or on demand basis, e.g., either when they suspect that there is a problem, or during all-too-infrequent routine maintenance. In addition, what, if any, information that is collected is not stored for future use. The disclosed schemes address both of these shortfalls by collecting information from a plurality of sensors on a routine basis that assesses not only a performance, health and/or efficiency of the HVAC system, but also of the ducting and the building envelope as separate and distinct measure of efficiency and storing data for future use, combining it with other data and creating business intelligence that can be used to make environmental condition control decisions and/or identify environmental condition control problems in the building as a whole. Furthermore, the current procedure for collecting this information does not allow the user to calculate duct efficiency, or envelope efficiency, as this calculation requires that data be collected over time, not just at one point in time.

The disclosed schemes are unique in that a new measure of envelope efficiency is employed. In the disclosed schemes a total heat gain or loss in a building may be determined. Total building heat gain or loss has never been measured because building component manufacturers are focused on the heat gain or loss potential from a single component of the building, such as the walls, roof, windows, doors and the like, but not on the overall building as an integrated operating unit.

The disclosed systems and methods are based on an HVAC system with only one compressor, one condenser fan, and one air handling fan. The disclosed systems and methods could be similarly used on any HVAC system with multiple or single compressors, condenser fans or air handling fans. The disclosed systems and methods are based on the HVAC system being installed in a typical "Package" or "Rooftop Unit (RTU)" used in a typical commercial building application. The disclosed systems and methods may also be adapted for use in HVAC systems that are "split" or "mini-split" systems.

The controller 140 and the data collected from the myriad sensors described above may constitute an integrated HVAC monitoring system to support the pre-diagnosis generation for the HVAC RBS. The HVAC RBS may also reference data collected from "other," "third party" or otherwise non-integrated monitoring systems. In the event that the monitoring system of a building/HVAC system identifies a problem with the HVAC system, the HVAC RBS may include its own data assessment, analysis and processing capacity to gather important information from such a monitoring system in a "monitoring system agnostic" manner in order that the HVAC RBS itself provides the high quality pre-diagnosis data to the building owner or operate who may then make a first level evaluation as to whether the repair may be effected using "in-house" staffing, or whether to solicit proposals from a plurality of available or pre-selected HVAC repair facilities or contractors. If the building owner or operator decides to solicit proposals from the plurality of available or pre-selected HVAC repair facilities or contractors, the building owner or operator may, via the HVAC RBS, "post" a solicitation, which may be in the form of an RFP, with historical data and the pre-diagnosis to an automated "quote board" in the HVAC RBS to solicit proposals from any one or more of the plurality of HVAC repair providers that choose to participate by submitting a bid after evaluation of the provided information. Building location, basic equipment information, historical HVAC data and a pre-diagnosis may be provided for the HVAC repair facilities or contractors to review in support of bid preparation. The process may be public (all of the plurality of contractors being able to see the bids) or it may involve "sealed" bids leaving flexibility to the building owners or operators in their selection criteria.

HVAC repair service facilities or contractors may review the HVAC RBS solicitation board or request to receive RFP's from the HVAC RBS based on filter criteria established by the HVAC repair service facilities or contractors. For example, HVAC repair service facilities or contractors could request to receive notification of all RFP's within a certain zip code or opportunities relating to a specific problem with which they consider themselves to be particularly familiar, e.g., a pre-diagnosis of "frozen evaporator coil."

HVAC repair service facilities or contractors may then individually prepare a bid for the work and submit the prepared bid to the building owner via the HVAC RBS. The bid may include a dollar amount to complete the work and may include an expected time interval for completion or other like data upon which the building owner or operator may base an acceptance of a bid for execution of the repair. The building owner or operator may then select from among the bidders, and contract with the "winning" bidder for the work. After the work is completed, the building owner or operator may provide ratings regarding the work performed by the HVAC repair service facility or contractor.

Figure 2:
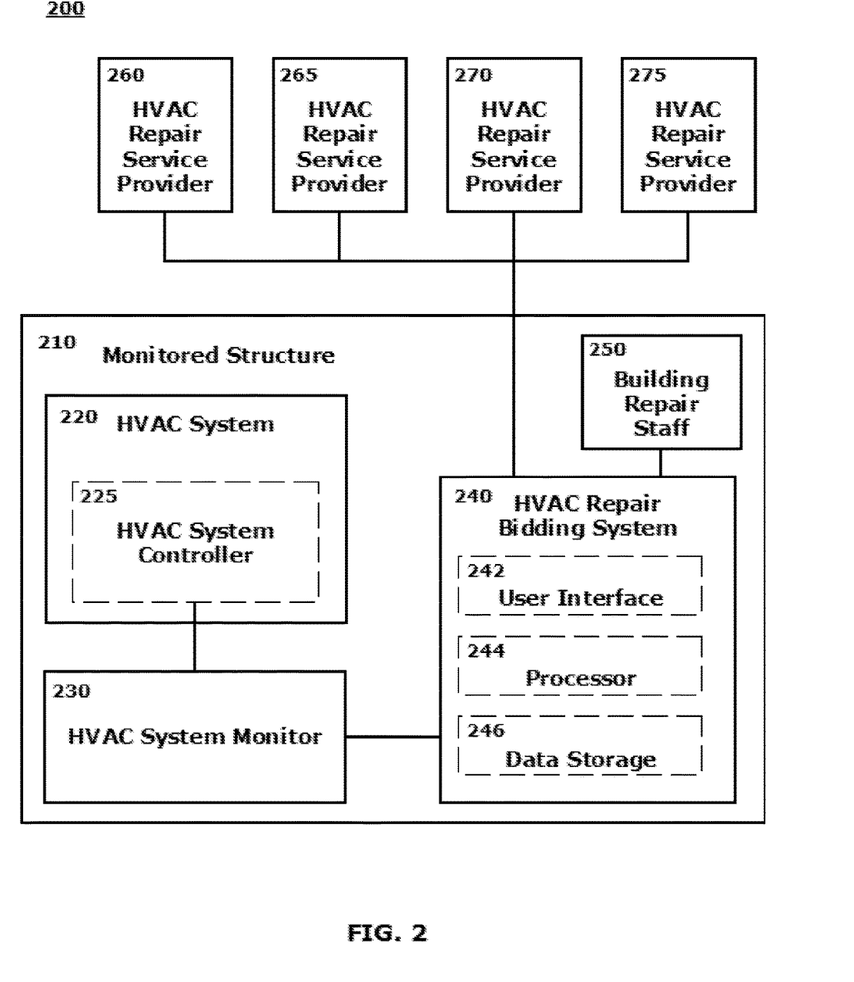
FIG. 2 illustrates a block diagram of a communication network between a monitored building and a plurality of contractors for soliciting and receiving automated bids for HVAC system repair in the monitored building based on a generated and forwarded pre-diagnosis of an HVAC system difficulty in the monitored building according to this disclosure.

FIG. 2 illustrates a block diagram of a communication network 200 between a monitored structure 210 and a plurality of HVAC repair service providers 260-275 for soliciting and receiving automated bids for HVAC system repair in the monitored structure 210 based on a generated and forwarded pre-diagnosis of an HVAC system difficulty in the monitored structure 210 according to this disclosure.

As shown in FIG. 2, the monitored structure 210 may include an integrated HVAC system 220. The HVAC system 220 may include some role of features shown in, for example, FIG. 1. Particularly, the HVAC system 220 in the monitored structure 210 may include some manner of HVAC system controller 225 that may be in communication with an HVAC system monitor 230. As indicated above, the HVAC system monitor 230 may be integral to the HVAC system 220, integral to an HVAC repair bidding system (RBS) 240 (as will be described in detail below), or may otherwise be a stand-alone system ("a third-party system"). Because of the specific configuration, the HVAC system monitor 230 may collect information regarding HVAC system parameters, analyze information regarding the HVAC system parameters and/or generate a pre-diagnosis of one or more detected HVAC system difficulties for use by the HVAC RBS 240.

The HVAC RBS 240 may comprise a particularly programmed system for implementing a scheme of bidding on and contracting for, HVAC repair services in the monitored structure 210. While shown in FIG. 2, as being integral to the monitored structure 210, placement of, and communication with, the HVAC RBS system 240 may be external to the monitored structure 210, and may, in fact, be a system that communicates with a number of monitored structures. The HVAC RBS may include a user interface 242, its own internal processor 244, and one or more integrated or connected data storage components 246. The HVAC RBS 240 may be in communication with a communication device associated with the building repair step 250 and with one or more HVAC repair service providers 260-275 via direct or networked wired or wireless communication.

The HVAC RBS 240 may collect data from the HVAC system monitor 230 in the monitored structure 210. This collected data may be related to the health and performance of the monitored structure 210 as a whole and/or the installed HVAC system 220 (and its operations). That collected data may be internally processed in the processor 244 of the HVAC RBS 240 or may be delivered to an external/associated server component. Regardless of the location of the processing, the data may be converted to a pre-diagnosis, which may be delivered to a building owner or operator via a user interface 242 associated with the HVAC RBS 240. The pre-diagnosis may be supplemented with historical data recovered by the processor 244 from the data storage component 246.

The building owner or operator may establish a set of automated criteria that may be implemented by the processor 244 to decide to either effect the repair on site with building repair step 250, or post a solicitation, which may be in the form of an RFP, the HVAC RBS 240. The posted solicitation may be separately pushed to one or more of a plurality of HVAC repair service providers 260-275, or multiple ones of the prospective HVAC repair service providers 260-275 may peruse the electronically-posted RFPs. Certain ones of the HVAC repair service providers 260-275 may be afforded an opportunity to input filter criteria into the HVAC RBS 240 in order that only solicitations meeting their particularized criteria may be pushed to them, or may be available when they take the opportunity to review those that are electronically-posted. One or more of the HVAC repair service providers 260-275 may select which ones, if any, of the solicitations to respond to with proposals. The building owners or operators may establish criteria in the HVAC RBS 240 by which to sort and select from among the proposals responsive to the solicitation. The entire process may be automated. Separately, one or more of the steps indicated above as being undertaken by criteria established by the building owners or operators may be manually undertaken by the building owners or operators. Upon selection of a "winning" proposal, selection information regarding contract award (which may include contract terms) may be communicated to the HVAC repair service provider that submitted the "winning" proposal. The "winning" HVAC repair service provider may then mobilize one or more service technicians to implement the repairs to the HVAC system 220 in the monitored structure 210 based on the pre-diagnosis and the historical data, and according to known repair means.

All of the building and HVAC system data may be collected by the HVAC system monitor 230 and stored in a data storage component 246 which may be integral to, or associated with, the HVAC RBS 240. The HVAC RBS 240 may apply certain analytic algorithms to the stored data via the processor 244 in order to convert the raw data to the pre-diagnosis that provides the basis for the solicitation. The data may be collected and stored as frequently as once every millisecond, or as infrequently as once every day.

In embodiments, the data may be evaluated to determine if certain key operating parameters are within manufacturer's specification and then evaluated to determine if key operating parameters meet the specifications developed by building owners, building operators, building occupants and/or other entities including system suppliers, system component suppliers and even government regulators. Competing specifications may be used to formulate the analytic algorithms. In the event that the HVAC system key operating parameters are substantially different from any of the defined or developed criteria, the HVAC RBS 240 may process the data and alert the user, including the building owner or operator, that the HVAC system 220 is suffering a difficulty. The HVAC RBS 240 may be able to isolate, diagnose and report symptoms and/or sources of the difficulty based on readings from some or all of the HVAC system sensors.

In embodiments, particular sets of algorithms may be additionally employed to monitor sensor health and to determine if additional sensors are providing readings (either combinations of sensors at a single point in time, or single sensors over time, or multiple sensors over time) that would indicate that there could be a problem with the HVAC system or that the system may soon have a problem. With this additional information, the processor may provide advanced diagnostic data as a part of the pre-diagnosis that is delivered to the building owner.

The disclosed system including the HVAC RBS 240 is unique in that, to date, companies in the industry are typically evaluating HVAC conditions only on an infrequent basis, either when one suspects that there is a problem, or during routine maintenance. In addition, any information that is being collected is not being provided to multiple HVAC repair contractors for diagnosis, evaluation and bidding purposes in the manner disclosed.

Figure 3:
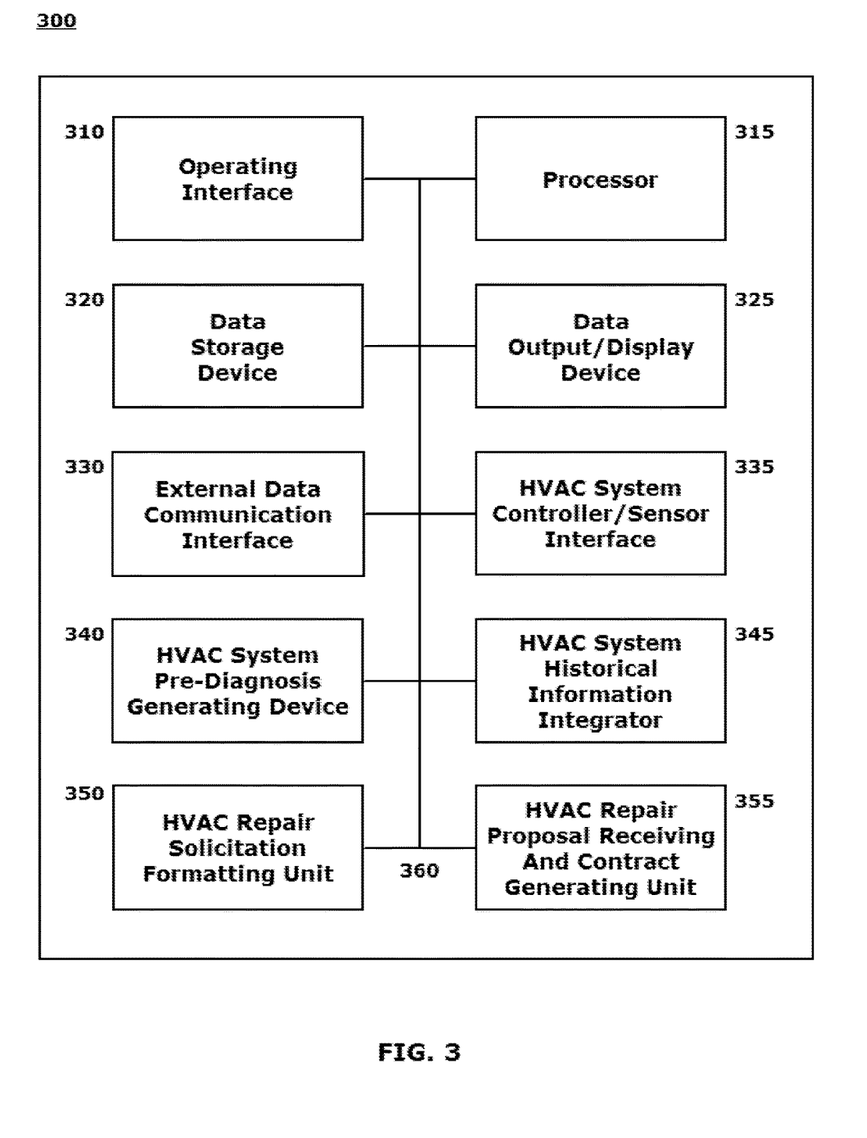
FIG. 3 illustrates a block diagram of an exemplary interactive bidding system for soliciting and receiving automated bids for HVAC system repair in a monitored building based on a generated and forwarded pre-diagnosis of an HVAC system difficulty in the monitored building according to this disclosure.

FIG. 3 illustrates a block diagram of an exemplary interactive bidding system (HVAC RBS) 300 for soliciting and receiving automated bids for HVAC system repair in a monitored building based on a generated and forwarded pre-diagnosis of an HVAC system difficulty in the monitored building according to this disclosure. The exemplary system 300 shown in FIG. 3 may be implemented as a unit integral to an HVAC system, may be located in the monitored building or may be implemented as a separate unit remote from, and in communication with, the HVAC system and or the monitored building.

The exemplary system 300 may include an operating interface 310 by which a user may communicate with the exemplary system 300 for directing at least a mode of operation of the exemplary system 300 and for directing certain functions of the automated bid solicitation scheme for effecting HVAC system repairs based on a pre-diagnosis of system difficulties. The operating interface 310 may be a locally accessible user interface associated with the HVAC system, located in the monitored building or located remotely and in communication with the HVAC system. The operating interface 310 may be configured as one or more conventional mechanisms common to control devices and/or computing devices that may permit a user to input information to the exemplary system 300. The operating interface 310 may be a part of a function of a graphical user interface (GUI) mounted on, integral to, or associated with, the HVAC RBS, or it may comprise any user manipulated interface associated with a local or remote computer comprising the exemplary system 300.

The exemplary system 300 may include one or more local processors 315 for individually operating the exemplary system 300. The processor 315 may reference sensor inputs received from a plurality of sensors and communicated to the exemplary system 300 via, for example, an HVAC system controller and/or some manner of HVAC system monitor to carry out the disclosed analysis of sensor data to result in a system pre-diagnosis regarding the detected HVAC system difficulty. The processor 315 may reference historical HVAC system operating information stored in one or more storage devices 320 to supplement the analysis and/or the resolved pre-diagnosis of the HVAC system difficulty. Processor 315 may include at least one conventional processor or microprocessor that interprets and executes instructions to direct specific functioning of the exemplary system 300 and an associated HVAC RBS for soliciting and receiving bids from external resources that may be usable for effecting HVAC system repair within the monitored building under the control of the exemplary system 300.

The exemplary system 300 may include one or more data storage devices 320. Such data storage device(s) 230 may be used to store sensor data, calculated and/or analyzed data and/or historical data regarding the operations of the HVAC system within the monitored building, as well as storing operating programs to be used by the exemplary system 300, and specifically the processor 315 in carrying into operation the disclosed functions. Data storage device(s) 320 may store an updatable database of sensor data, calculations and/or analysis results.

The data storage device(s) 320 may include a random access memory (RAM) or another type of dynamic storage device that is capable of storing updatable database information, and for separately storing instructions for execution of system operations by, for example, processor 315. Data storage device(s) 320 may also include a read-only memory (ROM), which may include a conventional ROM device or another type of static storage device that stores static information and instructions for processor(s) 315. Further, the data storage device(s) 320 may be integral to the exemplary system 300, or may be provided external to, and in wired or wireless communication with, the exemplary system 300, including as cloud-based data storage devices.

The exemplary system 300 may include at least one data output/display device 325, which may be configured as one or more conventional mechanisms that output information to a user, including, but not limited to, a display screen on a GUI of an HVAC system, HVAC RBS, or as a stand-alone component connected to, and in communication with, the exemplary system 300. The data output/display device 325 may be used to indicate one or more of (1) collected HVAC sensor data, (2) a generated pre-diagnosis, (3) the generated pre-diagnosis supplemented with historical data germane to the detected difficulty with the HVAC system, (4) a solicitation, which may be in the form of an RFP, to be posted to a readable electronic bulletin board or to be forwarded to one or more external resources (including according to filter criteria provided by the one or more external resources), (5) bids received from the external resources responsive to the solicitation, (6) a selection of a winning bid, (7) contractors to be forwarded to the extra resource submitting the winning bid to effect repairs to the HVAC system, and (8) other like information regarding the disclosed method, process or scheme.

Where appropriate, the exemplary system 300 may include at least one external data communication interface 330 by which the exemplary system 300 may communicate with one or more external resources, including an particularly HVAC system repair facilities and/or contractors for conveying the solicitation and/or receiving responsive bidding.

The exemplary system 300 may include at least one HVAC system controller/sensor interface 335 by which the exemplary system 300 may be communicatively connected with a plurality of temperature, humidity and current sensors located in the HVAC system, HVAC system ductwork, and/or in the monitored building serviced by the HVAC system. The HVAC system controller/sensor interface 335 may communicate with the HVAC system, HVAC system sensors. HVAC controller, and/or HVAC monitor for collecting data by which to generate a pre-diagnosis of a detected difficulty with the HVAC system. The communicating connections may be via wired means, wireless means, or a combination of the two.

The exemplary system 300 may include an HVAC system pre-diagnosis generating device 340, which may be provided as a standalone device or as a portion, and/or as a function, of the processor 315 in communication with the at least one data storage device 320. The HVAC system pre-diagnosis generating device 340 may apply algorithms or other analytic structures to the collected data on the operation of the HVAC system received via the HVAC system controller/sensor interface 335 in order to generate a pre-diagnosis of a detected difficulty with the HVAC system.

The exemplary system 300 may include an HVAC system historical information integrator 345, which may be provided as a standalone device or as a portion, and/or as a function, of the processor 315 in communication with at least one data storage device 320. The HVAC system historical information integrator 345 may reference stored historical data on the operation of the HVAC system to supplement the pre-diagnosis.

The exemplary system 300 may include an HVAC repair solicitation formatting unit 350. The HVAC repair solicitation formatting unit 350 may determine a format for the pre-diagnosis or supplemented pre-diagnosis to forward to a plurality of external resources as solicitations for bids to correct the detected difficulty specified by the pre-diagnosis or the supplemented pre-diagnosis. The HVAC repair solicitation formatting unit 350 may post one or more solicitations to an electronic bulletin board for review by the external resources, or may otherwise transmit to the external resources via the external data communication interface 330 such solicitations as they meet certain filter criteria established by the external resources for accepting solicitations.

The exemplary system 300 may include an HVAC repair proposal receiving and contract generating unit 355. Such a unit 355 may be usable to receive external resource bids responsive to the solicitation, select among the received bids a "winning" bid based on certain established and/or automated selection criteria, and may generate contract language/terms to be forwarded to the "winning" better to begin the process of affecting the repairs to the HVAC system to address the difficulty specified in the pre-diagnosis.

All of the various components of the exemplary system 300, as depicted in FIG. 3, may be connected internally, and potentially to a remote processing or data storage device by one or more data/control busses 360. These data/control busses 360 may provide wired or wireless communication between the various components of the exemplary system 300, whether all of those components are housed integrally in, or are otherwise external and connected to, other components of an image forming system with which the exemplary system 300 may be associated.

It should be appreciated that, although depicted in FIG. 3 as an essentially integral unit, the various disclosed elements of the exemplary system 300 may be arranged in any combination of sub-systems as individual components or combinations of components, integral to a single unit, or external to, and in wired or wireless communication with, the single unit of the exemplary system 300. In other words, no specific configuration as an integral unit or as a support unit is to be implied by the depiction in FIG. 3. Further, although depicted as individual units for ease of understanding of the details provided in this disclosure regarding the exemplary system 300, it should be understood that the described functions of any of the individually-depicted components may be undertaken, for example, by one or more processors 315 connected to, and in communication with, one or more data storage device(s) 320, all of which may support operations in the associated HVAC system, or the HVAC RBS.

Figure 4:
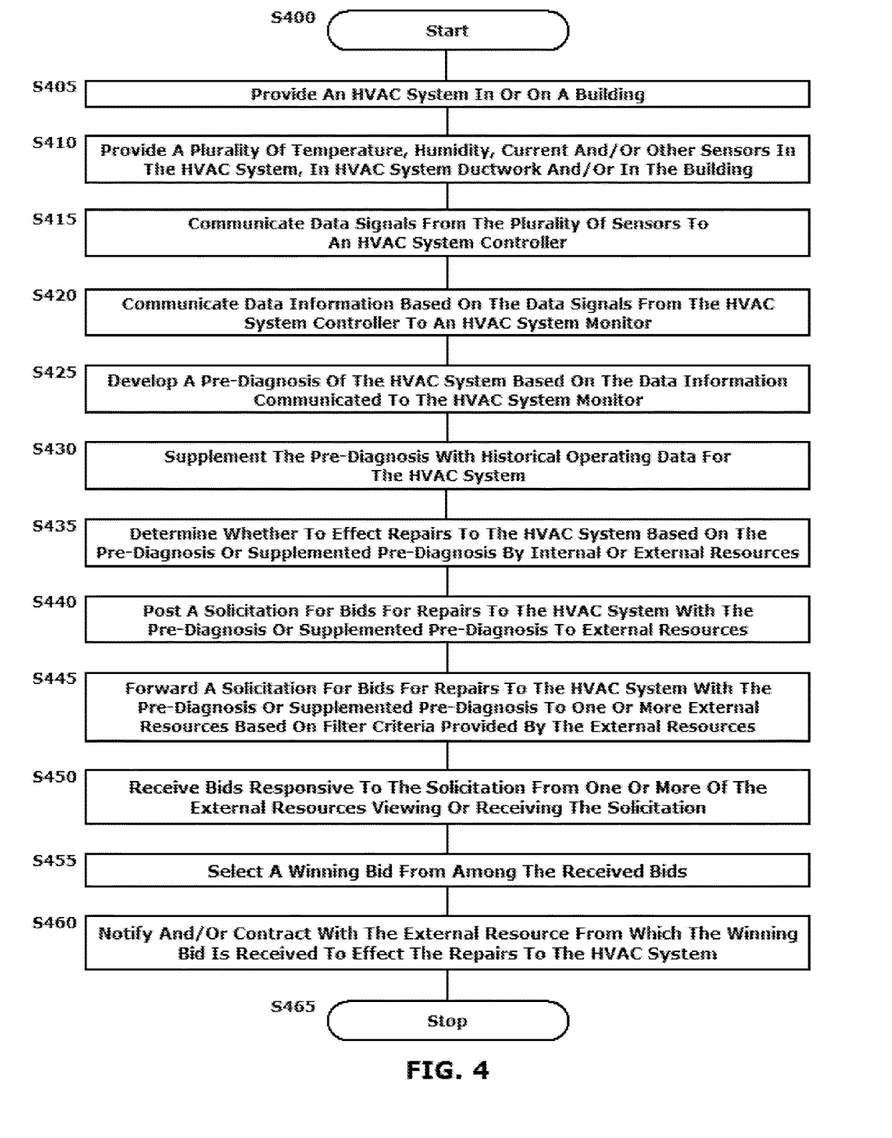
FIG. 4 illustrates a flowchart of an exemplary method for soliciting and receiving automated bids for HVAC system repair in a monitored building based on a generated and forwarded pre-diagnosis of an HVAC system difficulty in the monitored building according to this disclosure.

The disclosed embodiments may include an exemplary method for soliciting and receiving automated bids for HVAC system repair in a monitored building based on a generated and forwarded pre-diagnosis of an HVAC system difficulty in the monitored building. FIG. 4 illustrates a flowchart of such an exemplary method. As shown in FIG. 4, operation of the method commences at Step S400 and proceeds to Step S405.

In Step S405, an HVAC system may be provided in or on a building for adjusting environmental conditions within the building. Operation of the method proceeds to Step S410.

In Step S410, a plurality of temperature, humidity, current and/or other sensors may be provided in the provided HVAC system, in the HVAC system ductwork and in the involved building. Operation of the method proceeds to Step S415.

In Step 415, data signals may be communicated from the plurality of sensors to an HVAC system controller. Operation of the method proceeds to Step S420.

In Step S420, data information based on the data signals may be communicated from the HVAC system controller to an HVAC system monitor. The HVAC system monitor may be located within the monitored space associated with the HVAC system, or may otherwise be remote from and in electronic communication with the HVAC system. The communicated data signals, and thus the communicated data information, may be based on sensed temperature, humidity, current and other parameters. Operation of the method proceeds to Step S425.

In Step S425, a pre-diagnosis may be developed regarding the HVAC system based on the data information communicated to the HVAC system monitor that highlights one or more difficulties in the operation of the HVAC system. Operation of the method proceeds to Step S430.

In Step S430, the pre-diagnosis may be supplemented with historical operating data for the HVAC system in order to provide a broader, more detailed data set by which to define a particular difficulty experienced by the HVAC system. Operation of the method proceeds to Step S435.

In Step S435, a determination may be made whether to effect repairs to the HVAC system based on the pre-diagnosis or the supplemented pre-diagnosis by internal building repairs sources, or external HVAC repair service providers. Operation of the method proceeds to Step S440.

In Step S440, a solicitation may be posted for bids for repairs to the HVAC system with the pre-diagnosis or supplemented pre-diagnosis information to external resources. Operation of the method proceeds to Step S445.

In Step S445, a solicitation may be forwarded to external sources for bids for repairs to the HVAC system along with the pre-diagnosis or supplemented pre-diagnosis information. The solicitations sent to any particular one or more of the extra resources may be based on filter criteria provided by that one or more of the external resources. Operation of the method proceeds to Step S450.

In Step S450, it may be received responsive to the solicitation from one or more of the external resources upon viewing or receiving the solicitation. Operation of the method proceeds to Step S455.

In Step S455, a winning bid may be selected from among the received bids responsive to the solicitation. Operation of the method proceeds to Step S460.

In Step S460, the external resource from which the winning bid is received may be notified and or contracted with to affect the repairs to the HVAC system. Operation of the method proceeds to Step S465, where operation of the method ceases.

The above-described exemplary systems and methods reference certain conventional components to provide a brief, general description of suitable environmental condition control means for clarity and ease of understanding. Those skilled in the art will appreciate that other embodiments of the disclosed subject matter may be practiced with many types and configurations of individual devices and combinations of devices particularly common to HVAC and/or climate control systems of varying complexity. No limitation to the variety or configuration of individual component devices included in the environmental condition control systems is to be inferred from the above description.

The exemplary depicted sequences of executable instructions represent only examples of corresponding sequences of acts for implementing the functions described in the steps. The exemplary depicted steps in the above-described methods may be executed in any reasonable order to carry into effect the objectives of the disclosed embodiments. No particular order to the disclosed steps of the method is necessarily implied by the depiction in FIG. 4, and the accompanying description, except where a particular method step is a necessary precondition to execution of any other method step. Individual method steps may be carried out in sequence or in parallel in simultaneous or near simultaneous timing, as appropriate.

Although the above description may contain specific details, they should not be construed as limiting the claims in any way. Other configurations of the described embodiments of the disclosed systems and methods are part of the scope of this disclosure. For example, the above-described sensing and processing functions may be carried out by any form of sensor typically adapted for use in recovering temperature, humidity and power consumption values. The described control and processing functions may be carried out using hardware circuits, software instructions, or firmware, as well as with combinations thereof.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A repair bidding system, comprising:
   a climate control monitoring device that communicates with a plurality of sensors positioned to sense environmental parameters of at least one of a climate control system, climate control ducting and a building supported by the climate control system;
   an analysis device that
      receives data from the climate control monitoring device;
      analyzes the received data to detect an operating anomaly in the climate control system; and
      generates a diagnostic report regarding the detected anomaly;
   a bidding exchange device that
      generates a bid solicitation including the diagnostic report;
      communicates the generated bid solicitation to a plurality of external repair resources; and receives responsive bids from at least one of the plurality of external repair resources;

automatically selects a particular bid proposal from among the responsive bids according to a pre-determined set of criteria, the pre-determined set of criteria including at least an evaluation of a proposed cost of a repair and a proposed timeframe to effect the repair; and an output device that displays the diagnostic report to a user.

2. The repair bidding system of claim 1, further comprising a user interface by which the user inhibits operation of the bidding exchange device.

3. The repair bidding system of claim 1, the analysis device detecting an operating anomaly by analyzing that predetermined limits for a particular operating parameter are exceeded.

4. The repair bidding system of claim 1, the analysis device supplementing the diagnostic report with stored historical operating data for the climate control system.

5. The repair bidding system of claim 4, the bidding exchange device communicating supplemental stored historical data with the generated bid solicitation.

6. The repair bidding system of claim 5, the bidding exchange device generating and forwarding to the external repair resource that submitted the selected particular bid proposal a repair agreement for execution and completion by the external repair resource.

7. The repair bidding system of claim 1, the analysis device receiving and analyzing data from a plurality of climate control monitoring devices in separate buildings and generating diagnostic reports for anomalies detected in any one or more of the plurality of climate control systems, the bidding exchange device being associated with the analysis device.

8. The repair bidding system of claim 1, the bidding exchange device being associated with a plurality of analysis devices to generate and communicate bid solicitations based on diagnostic reports received from any one or more of the plurality of analysis devices, the bidding exchange device receiving and sorting responsive bids associated with each of the bid solicitations.

9. A method for repair bidding, comprising:

monitoring a plurality of sensors positioned to sense environmental parameters of at least one of a climate control system, climate control ducting and a building supported by the climate control system;

analyzing, with a particularly-programmed analysis device, data received from the plurality of sensors to detect an operating anomaly in the climate control system;

generating, by the analysis device, a diagnostic report regarding the detected anomaly;

generating, with a bidding exchange device, a bid solicitation including the generated diagnostic report communicated from the analysis device;

communicating the generated bid solicitation from the bidding exchange device to a plurality of external repair resources;

receiving, with the bidding exchange device, responsive bids from at least one of the plurality of external repair resources;

displaying the generated diagnostic report to a user, the user inhibiting operation of the bidding exchange device in generating and communicating bid solicitations; and automatically selecting a particular bid proposal from among the responsive bids according to a pre-determined set of criteria, the pre-determined set of criteria including at least an evaluation of a proposed cost of a repair and a proposed timeframe to effect the repair.

10. The method of claim 9, the analysis device detecting an operating anomaly by analyzing that predetermined limits for a particular operating parameter in the climate control system are exceeded.

11. The method of claim 9, further comprising:

supplementing the diagnostic report with stored historical operating data for operation of the climate control system; and communicating supplemental stored historical data with the generated bid solicitation.

12. The method of claim 11, further comprising generating and forwarding to the external repair resource that submitted the selected particular bid proposal a repair agreement for execution and completion by the external repair resource.

13. The method of claim 9, the analysis device receiving and analyzing data from a plurality of climate control monitoring devices in separate buildings and generating diagnostic reports for anomalies detected in any one or more of the plurality of climate control systems, the bidding exchange device being associated with the analysis device.

14. The method of claim 9, the bidding exchange device being associated with a plurality of analysis devices to generate and communicate bid solicitations based on diagnostic reports received from any one or more of the plurality of analysis devices, the bidding exchange device receiving and sorting responsive bids associated with each of the bid solicitations.

15. A non-transitory data storage medium storing instructions that, when executed by a processor, cause the processor to execute steps of a method for repair bidding, the method comprising:

monitoring a plurality of sensors positioned to sense environmental parameters of at least one of a climate control system, climate control ducting and a building supported by the climate control system;

analyzing data received from the plurality of sensors to detect an operating anomaly in the climate control system;

generating a diagnostic report regarding the detected anomaly;

generating a bid solicitation including the generated diagnostic report;

communicating the generated bid solicitation to a plurality of external repair resources;

receiving responsive bids from at least one of the plurality of external repair resources; and displaying the generated diagnostic report to a user, the user inhibiting operation of the bidding exchange device in generating and communicating bid solicitations; and automatically selecting a particular bid proposal from among the responsive bids according to a pre-determined set of criteria, the pre-determined set of criteria including at least an evaluation of a proposed cost of a repair and a proposed timeframe to effect the repair.

* * * * *